US 6,750,997 B2

(12) United States Patent
Tamaru et al.

(10) Patent No.: US 6,750,997 B2
(45) Date of Patent: Jun. 15, 2004

(54) SCANNING DEVICE AND IMAGE FORMING APPARATUS

(75) Inventors: Yasuo Tamaru, Nagoya (JP); Ryoichi Matsushima, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 16 days.

(21) Appl. No.: 10/303,817

(22) Filed: Nov. 26, 2002

(65) Prior Publication Data

US 2003/0103254 A1 Jun. 5, 2003

(30) Foreign Application Priority Data

Nov. 30, 2001 (JP) ......................... 2001-366895

(51) Int. Cl.⁷ .............................................. G02B 26/08
(52) U.S. Cl. ........................ 359/196; 347/259; 347/260; 359/871
(58) Field of Search ................................. 359/196–226, 359/871, 848, 811, 819; 347/241–243, 257–259; 248/466, 468, 475.1, 488

(56) References Cited

U.S. PATENT DOCUMENTS 5,592,337 A * 1/1997 Hama .......................... 359/872

FOREIGN PATENT DOCUMENTS

| JP | A 10-90627 | 4/1998 |
| JP | A 11-149053 | 6/1999 |
| JP | A 2001-166241 | 6/2001 |

* cited by examiner

Primary Examiner—James Phan
(74) Attorney, Agent, or Firm—Oliff & Berridge, PLC

(57) ABSTRACT

A laser beam reflected off a polygon mirror travels below a beam portion and is reflected off a reflection mirror. The laser beam reflected off the reflection mirror is emitted through an opening formed directly below the beam portion. The beam portion is provided above the opening through leg portions. With the structure, the rigidity on the periphery of the opening can be ensured. Supporting portions for supporting the reflection mirror are reinforced by reinforcing portions, so that the reflection mirror is prevented from being vibrated. In addition, the reflection mirror is supported such that the reflection mirror does not contact the beam portion. Even when the beam portion is vibrated, the vibration is not conveyed from the beam portion to the reflection mirror.

17 Claims, 5 Drawing Sheets

SCANNING DEVICE AND IMAGE FORMING APPARATUS

BACKGROUND OF THE INVENTION

1. Field of Invention

The invention relates to a scanning device that scanningly irradiates a beam emitted from a light source and an image forming apparatus including the scanning device.

2. Description of Related Art

In a known scanning device, a beam emitted from a light source is deflected in a predetermined scanning direction and reflected off a reflection mirror. The reflected beam is emitted outside the scanning device through an opening formed on a frame thereof. For example, in a scanning device for use in an image forming apparatus, such as laser printers, the opening is formed on the frame of the scanning device so as to face a photosensitive member, such as a photosensitive drum. The beam emitted through the opening scans across the surface of the photosensitive member to form an electrostatic latent image.

The frame of the scanning device where the opening is formed is not as rigid as other portions of the frame. Therefore, it is difficult to fix the reflection mirror securely at a portion near the opening, which adversely affects the beam exposing accuracy of the scanning device. For example, if a speed of a polygon motor in a scanning device of a laser printer is increased and vibrations of the polygon motor are conveyed to the reflection mirror, the reflection mirror is vibrated, resulting in poor image formation.

SUMMARY OF THE INVENTION

Accordingly, one exemplary aspect of the invention is to provide a scanning device that prevents a reflection mirror from vibrating and an image forming apparatus including such a scanning device.

A scanning device according to the invention may include a light source that emits light, a deflecting device that deflects the light emitted from the light source in a predetermined scanning direction, a reflection mirror that reflects the light deflected by the deflecting device, a frame that accommodates the reflection mirror and has an opening through which the light reflected by the reflection mirror passes, a length of the reflection mirror in the predetermined scanning direction being longer than a length of the opening in the predetermined scanning direction, a supporting member that supports the reflection mirror at the frame, the supporting member being provided away from the opening in the predetermined scanning direction, and a reinforcing member provided between the opening and the supporting member.

BRIEF DESCRIPTION OF THE DRAWINGS

An embodiment of the invention will be described in detail with reference to the following figures wherein.

DETAILED DESCRIPTION OF PREFERRED EMBODIMENTS

Figure 1:
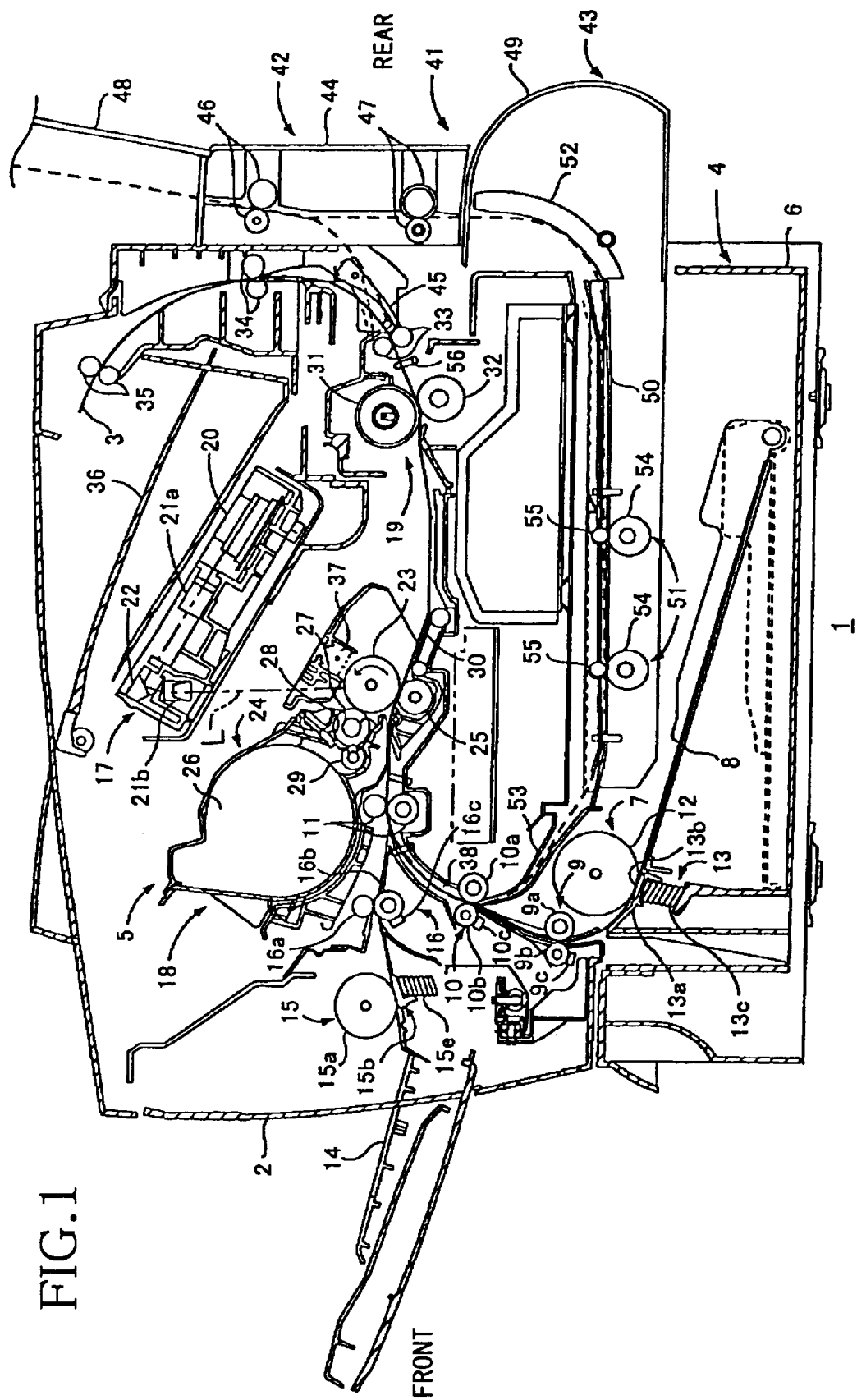
FIG. 1 is a side cross-sectional view showing an essential portion of a laser printer according to an embodiment of the invention.

An embodiment of the invention will be described in detail with reference to the figures. FIG. 1 is a side cross-sectional view showing an essential portion of a laser printer 1 as an image forming apparatus according to an embodiment of the invention. The laser printer 1 according to the embodiment is an electrophotographic type printer.

As shown in FIG. 1, the printer 1 includes a main casing 2, a feeder section 4 for feeding a paper sheet 3 as a recording medium, and an image forming section 5 for forming an image on the fed sheet 3. The feeder section 4 and the image forming section 5 are installed in the casing 2.

The feeder section 4 includes a first sheet supply tray 6 removably set on a bottom of the main casing 2, a sheet supply portion 7 disposed at one side of the sheet supply tray 6, a sheet mount plate 8 disposed in the sheet supply tray 6, a first transport portion 9, a second transport portion 10, and register rollers 11. The first and second transport portions 9, 10 are positioned at a downstream side of the sheet supply portion 7 in a sheet feeding direction. The register rollers 11 are positioned downstream of the first and second transport portions 9, 10.

The sheet supply tray 6 is of a box shape with an upper open construction so as to accommodate therein a stack of sheets 3. The sheet supply tray 6 is slidable with respect to the bottom of the main casing 2, so that the tray 6 can be set into or detached from the casing 2.

The sheet supply portion 7 includes a sheet supply roller 12 and a separation pad 13 in confrontation therewith. The separation pad 13 includes a support frame 13a, a pad member 13b, and a spring 13c.

The support frame 13a is generally L-shape in cross section including a flat member positioned immediately below the sheet supply roller 12 and a support member extending downwardly from one side edge of the flat member and bent at a right angle with respect to the flat member. A lower end portion of the support member is pivotally connected to the main casing 2. The pad member 13b is embedded in one surface of the flat member to confront with the sheet supply roller 12. The spring 13c is seated on the other surface of the flat member to urge the pad member 13b toward the sheet supply roller 12.

The sheet mount plate 8 is adapted for mounting thereon a stack of sheets 3 in the sheet supply tray 6. The sheet mount plate 8 has a rear end pivotally connected to the sheet supply tray 6 and a front free end movable in a vertical direction. As sheet stack amount on the sheet mount plate 8 is increased, the free end of the sheet mount plate 8 is pivotally moved downwardly about the rear pivot axis. A compression spring (not shown) is provided below the sheet mount plate 8 for urging the sheet mount plate 8 toward the sheet supply roller 12. Upon rotation of the sheet supply roller 12, a leading end portion of the uppermost sheet 3 on the sheet stack on the sheet mount plate 8 is nipped between the sheet supply roller 12 and the pad member 13b. In this manner, each uppermost sheet 3 is separated from the sheet stack and is delivered.

The sheet 3 is fed to the register rollers 11 through a sheet transport path 38 between the sheet supply portion 7 and the image forming section 5 by way of the first and second transport portions 9, 10. The first transport portion 9 includes a first transport roller 9a and a first paper dust removing roller 9b. While the sheet 3 passes between the first transport roller 9a and the first paper dust removing roller 9b, the paper dust on the sheet 3 is removed by the first paper dust removing roller 9b by electrostatically absorbing the paper dust. The paper dust adhered to the first paper dust removing roller 9b is scraped off by a first sponge member 9c. Similarly, the second transport portion 10 includes a second transport roller 10a and a second paper dust removing roller 10b. While the sheet 3 passes between the second transport roller 10a and the second paper dust removing roller 10b, the paper dust on the sheet 3 is removed by the second paper dust removing roller 10b by electrostatically absorbing the paper dust. The paper dust adhered to the second paper dust removing roller 10b is scraped off by a second sponge member 10c. The register rollers 11 includes a pair of rollers for correcting diagonal feeding of the sheet 3 so as to feed the sheet 3 in a correct orientation to the image forming section 5.

A second sheet supply tray 14 is disposed on a front section of the main casing 2 with a sheet supply portion 15 disposed at one side of the sheet supply tray 14. The sheet supply portion 15 includes a sheet supply roller 15a and a separation pad 15b in confrontation therewith. The sheet supply portion 15 also includes a spring 15c. The separation pad 15b is embedded in one surface of a flat member to confront with the sheet supply roller 15a. The spring 15c is seated on the other surface of the flat member to urge the separation pad 15b toward the sheet supply roller 15a.

The sheet 3 is fed to the register rollers 11 through a sheet transport path between the sheet supply portion 15 and the image forming section 5 by way of a third transport portion 16. The third transport portion 16 includes a third transport roller 16a and a third paper dust removing roller 16b. While the sheet 3 passes between the third transport roller 16a and the third paper dust removing roller 16b, the paper dust on the sheet 3 is removed by the third paper dust removing roller 16b by electrostatically absorbing the paper dust. The paper dust adhered to the third paper dust removing roller 16b is scraped off by the third sponge member 16c.

The image forming section 5 includes a scanning unit 17 as a scanning device, a process unit 18, and a fixing unit 19. The scanning unit 17 is disposed at an upper interior portion of the main casing 2, and includes a polygon mirror 20, an fθ lens 21a, a cylindrical lens 21b, and a reflection mirror 22. As will be described in detail below, a laser beam L is emitted from the scanning unit 17 and scanningly irradiated at a high speed onto a surface of a photosensitive drum 23 of the process unit 18.

The process unit 18 is disposed below the scanning unit 17. The process unit 18 is removably set into the main casing 2. The process unit 18 includes a drum cartridge and a developing cartridge 24. The drum cartridge houses therein the photosensitive drum 23 as a photosensitive member, an image transfer roller 25, and a scorotron charger 37. The developing cartridge 24 is removably set with respect to the drum cartridge. The developing cartridge 24 houses therein a toner hopper 26, a developing roller 27, a toner layer thickness regulation blade 28, and a toner supply roller 29.

In the toner hopper 26, positively chargeable non-magnetic single component type polymerized toner is filled as an developing agent. The toner is supplied to the developing roller 27 by the toner supply roller 29, and are carried on the developing roller 27 as a constant thin thickness toner layer because of a frictional sliding relation with the toner layer thickness regulation blade 28. The photosensitive drum 23 is rotatably disposed in confronting relation to the developing roller 27. The photosensitive drum 23 includes a drum body which is grounded, and a positively chargeable photosensitive layer made from polycarbonate formed over the drum body.

In accordance with the rotation of the photosensitive drum 23 in a direction indicated by an arrow, the surface of the photosensitive drum 23 is uniformly charged with positive polarity by means of the scorotron charger 37. Thereafter, the photosensitive drum 23 is subjected to exposure to the laser beam L scanningly emitted from the scanning unit 17 at a high speed according to the print data, whereupon an electrostatic latent image is formed on the surface of the photosensitive drum 23. Then, in accordance with the rotation of the developing roller 27, the toner carried on the developing roller 27 and charged with positive polarity is deposited on the electrostatic latent image formed on the photosensitive drum 23, thereby making the image visible. In other words, the toner is supplied to parts of the photosensitive drum 23 selectively exposed to the laser beam L where the potential level is lower than the remaining part of the photosensitive drum 23 surface uniformly positively charged. Thus, a visible toner image is formed on the photosensitive drum 23 to complete a reverse image developing.

The transfer roller 25 is positioned immediately below the photosensitive drum 23. The transfer roller 25 includes a metal roller shaft and an electrically conductive rubber layer formed over the rotation shaft. A predetermined transfer bias voltage is applied to the transfer roller 25 for the toner transfer from the photosensitive drum 23 to the sheet 3. When the sheet 3 passes between the photosensitive drum 23 and the transfer roller 25, the visible toner image is transferred onto the sheet 3. Then, the sheet 3 is delivered to the fixing unit 19 through a transport belt 30.

The fixing unit 19 is positioned beside and downstream of the process unit 18. The fixing unit 19 includes a heat roller 31, a pressure roller 32 in pressure contact with the heat roller 31, and feed rollers 33 positioned downstream of the heat roller 31 and the pressure roller 32. The heat roller 31 is made from a metal and is provided with a halogen lamp as a heat source. The toner image transferred onto the sheet 3 at the process unit 18 is thermally fixed to the sheet 3 while the sheet 3 passes through the heat roller 31 and the pressure roller 32. The sheet 3 is then delivered to downstream side feed rollers 34 and discharge rollers 35 disposed in the main casing 2 by way of the feed rollers 33 of the fixing unit 19. The sheet 3 fed by the downstream side feed rollers 34 is discharged onto a discharge tray 36 by way of the discharge rollers 35.

In the laser printer 1, residual toner remaining on the surface of the photosensitive drum 23, after the toner is transferred to the sheet 3 by the transfer drum 25, is collected by the developing roller 27. This toner collection manner is a so called cleaner-less system in which a blade for wiping out the residual toner and a residual toner container can be dispensed with, to simplify an overall arrangement of the image forming device.

A sheet re-circulation unit 41 is provided for forming images on both surfaces of the sheet 3. The re-circulation unit 41 includes a sheet reverse section 42 and a re-circulation tray 43 integrally therewith. The re-circulation unit 41 is positioned at a rear wall of the main casing 2 in such a manner that the sheet reverse section 42 is attached beside the rear wall, and the re-circulation tray 43 is detachably inserted into the rear wall at a position above the sheet supply tray 6 of the feeder section 4.

The sheet reverse section 42 has a casing 44 having generally a rectangular cross section and attached to the rear wall of the main casing 2. In the casing 44, a flapper 45, reverse rollers 46 and re-circulation rollers 47 are provided. Further, a reverse guide plate 48 extends upwardly from an upper end portion of the casing 44. The flapper 45 is pivotably supported at the rear portion of the main casing 2 and is positioned at a downstream side of the feed rollers 33. The flapper 45 is pivotally moved upon energization or de-energization of a solenoid (not shown) for switching a feeding direction of the one-sided image carrying sheet 3 fed by the feed rollers 33 either to the downstream feed rollers 34 as shown by a solid line, or to the reverse rollers 46 as shown by a broken line.

The reverse rollers 46 include a pair of rollers. The reverse rollers 46 are positioned downstream of the flapper 45 and at an upper portion of the casing 44. Rotational direction of the reverse rollers 46 is changeable in both forward and reverse directions. The reverse rollers 46 are first rotated in the forward direction to direct the sheet 3 toward the reverse guide plate 48, and then rotated in the reverse direction to transport the sheet 3 in the reverse direction.

The re-circulation rollers 47 are positioned downstream of the reverse rollers 46 and are positioned immediately therebelow in the casing 44. The re-circulation rollers 47 include a pair of rollers to direct the sheet 3 reversely driven by the reverse rollers 46 toward the re-circulation tray 43.

For printing an image on a back surface of the sheet 3 whose front surface has been formed with an image, the flapper 45 is switched to a position allowing the sheet 3 to be fed toward the reverse rollers 46. Thus, the sheet 3 whose front surface has been formed with an image is received in the sheet reverse section 42. After the sheet 3 reaches the reverse rollers 46, the reverse rollers 46 are rotated in the forward direction for temporarily discharging the paper upwardly along the reverse guide plate 48. When a major part of the sheet 3 is fed out of the casing 44 and a trailing end portion of the sheet 3 is nipped between the reverse rollers 46, the rotation of the reverse rollers 46 in the forward direction is stopped. Then, the reverse rollers 46 are reversely rotated to feed the sheet 3 downwardly toward the re-circulation rollers 47.

A sheet sensor 56 is provided downstream of the fixing unit 19 for detecting the sheet 3. A reverse timing for changing the rotating direction of the reverse rollers 46 from the forward direction to the reverse direction is controlled such that the reverse timing occurs after an elapse of a predetermined period starting from a detection timing at which the sheet sensor 56 detects a trailing edge of the sheet 3. Further, the flapper 45 is switched to its original posture, i.e., a posture allowing the sheet 3 to be fed to the downstream feed rollers 34 from the feed rollers 33 upon completion of feeding of the sheet 3 to the reverse rollers 46.

The sheet 3 reversely fed by the re-circulation rollers 47 is delivered to the re-circulation tray 43 by the re-circulation rollers 47. The re-circulation tray 43 has a sheet receiving portion 49, a tray 50 and diagonally feed rollers 51. The sheet receiving portion 49 is externally attached to the main casing 2 at a position below the sheet reverse section 42, and has an arcuate sheet guide member 52. In the sheet receiving portion 49, the sheet 3 fed by the re-circulation rollers 47 is oriented in a substantially horizontal direction along the curvature of the sheet guide member 52 toward the tray 50.

The tray 50 has a rectangular plate-like shape, and is oriented in a horizontal direction above the sheet supply tray 6. A downstream end of the tray 50 is connected to a re-circulation path guide 53 provided along the sheet transport path 38 in order to guide the sheet 3 from the tray 50 to the second transport portion 10.

At a sheet path on the tray 50, two diagonally feed rollers 51, 51 are positioned and spaced away from each other in the sheet feeding direction. These diagonally feed rollers 51, 51 are adapted to feed the sheet 3 in a direction for permitting the sheet 3 to be in abutment with a reference plate (not shown). The reference plate is positioned at one widthwise edge area of the tray 50. Each diagonally feed roller 51 includes a diagonal feed drive roller 54 whose rotation axis extends substantially perpendicular to the sheet feeding direction, and a diagonal feed driven roller 55 in nipping relation to the diagonal feed drive roller 54. A rotation axis of the diagonal feed driven roller 55 extends in a slanting direction for allowing the sheet 3 to be brought into abutment with the reference plate.

The sheet 3 delivered from the sheet receiving portion 49 to the tray 50 moves toward the image forming section 5, with the sheet 3 having been turned upside down, through the re-circulation path guide 53, while one widthwise edge of the sheet 3 is in slidingly abutting relation to the reference plate by the driving of the diagonally feed rollers 51. At the image forming section 5, the back surface of the sheet 3 is in confrontation with the photosensitive drum 23 and a toner image is transferred to the sheet 3. The toner image is then fixed at the fixing unit 19. Thereafter, the sheet 3 having the images formed on both surfaces thereof is discharged onto the discharge tray 36.

The scanning unit 17 will be described in detail below, with reference to FIGS. 2 and 3. A frame cover 59 is omitted in FIG. 2, and only the center axis of the polygon mirror 20 is indicated in FIG. 3 to simplify the illustration.

Figure 2:
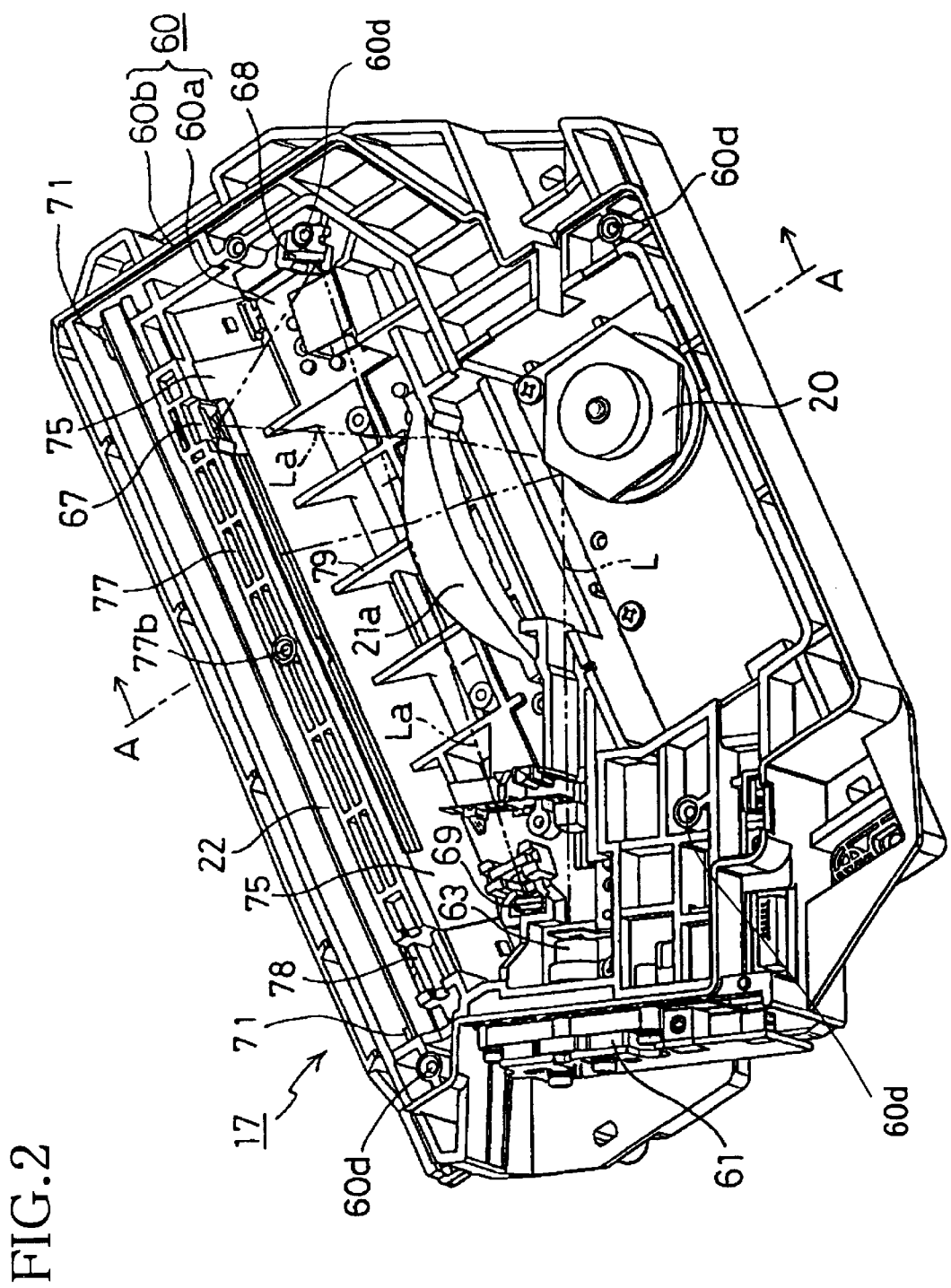
FIG. 2 is a perspective view of a scanning unit of the laser printer.
Figure 3:
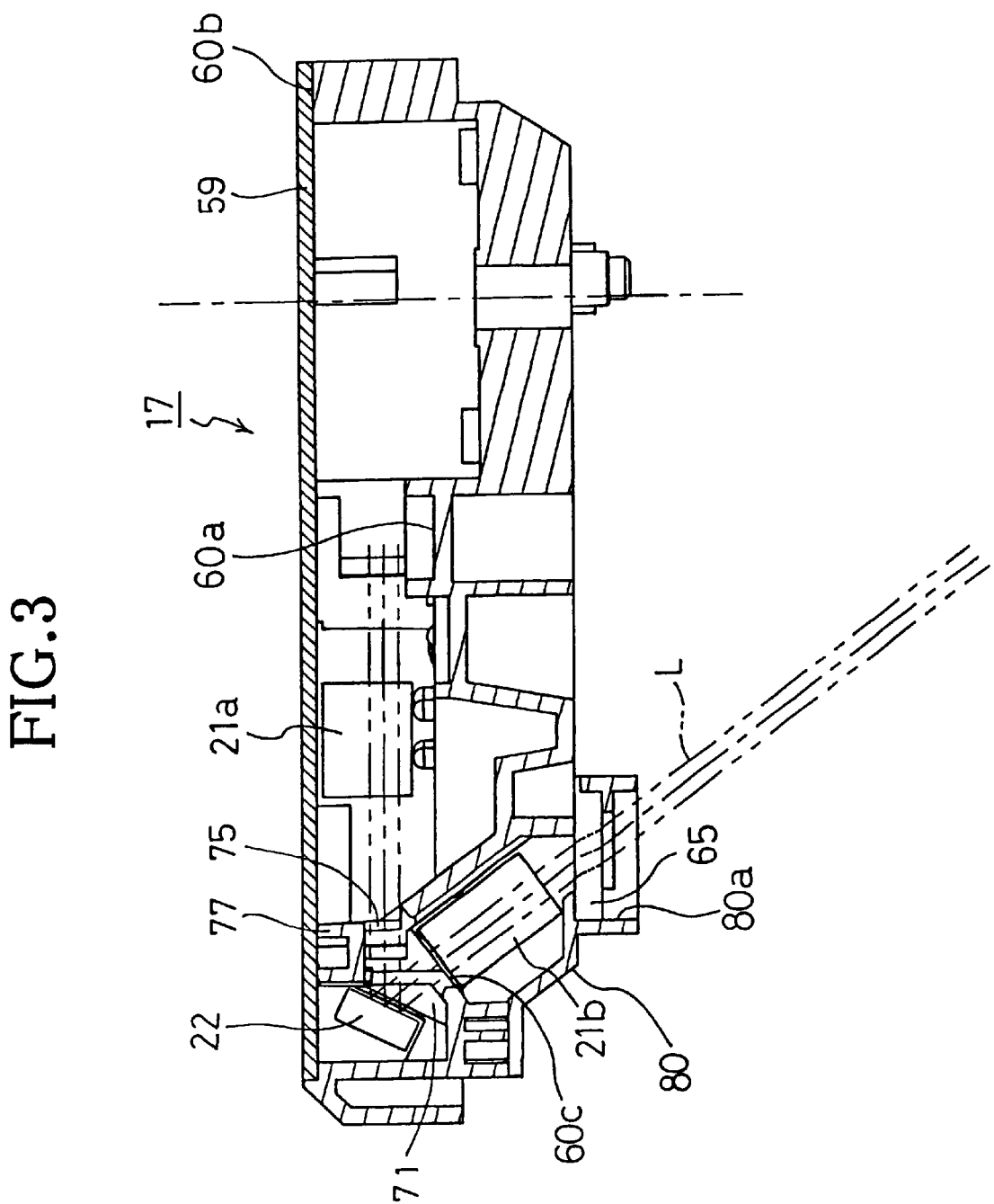
FIG. 3 is a cross sectional view of the scanning unit taken along line A—A of FIG. 2.

As shown in FIGS. 2 and 3, the scanning unit 17 has a box-shaped frame 60 that is open upward. The frame 60 includes a substantially flat bottom plate 60a having an opening 60c and a side wall 60b that stands upwardly from the periphery of the bottom plate 60a. A collimator lens 63, the polygon mirror 20 as a deflecting device, the fθ lens 21a, and the reflection mirror 22 are fixed on a surface of the bottom plate 60a, forming an optical path of the laser beam L emitted from a laser emitting portion 61 fixed on the side wall 60b. Below the opening 60c, a cover 80 is attached to a lower surface of the bottom plate 60a. The cylindrical lens 21b is disposed in an area defined by the lower surface of the bottom plate 60a and the cover 80. The cover 80 has an opening 80a that is covered by a cover glass 65.

The laser beam L emitted from the laser emitting portion 61 is deflected by the polygon mirror 20 in a predetermined scanning direction, and reflected off the reflection mirror 22, as shown in FIG. 3. The reflected laser beam L is emitted outside the scanning unit 17 through the opening 60c, formed on the bottom plate 60a, the cylindrical lens 21b and the cover glass 65.

As shown in FIG. 2, a first beam detecting (BD) mirror 67 is disposed on a front end side of the reflection mirror 22. A second beam detecting (BD) mirror 68 is disposed at a position out of the optical path of the deflected laser beam L toward the photosensitive drum 23. In cooperation with the first and second BD mirrors 67, 68, a laser beam La is directed in a direction of the scanning origin point to a beam detecting (BD) sensor 69. An ON/OFF timing of the laser emitting portion 61 is set based on the timing that the BD sensor 69 detects the laser beam La. With this structure, the laser beam L can be emitted at the precise timing.

Supporting structures for the reflection mirror 22 and its peripheral area including the opening 60c are described below, with reference to FIGS. 4 and 5.

Figure 4:
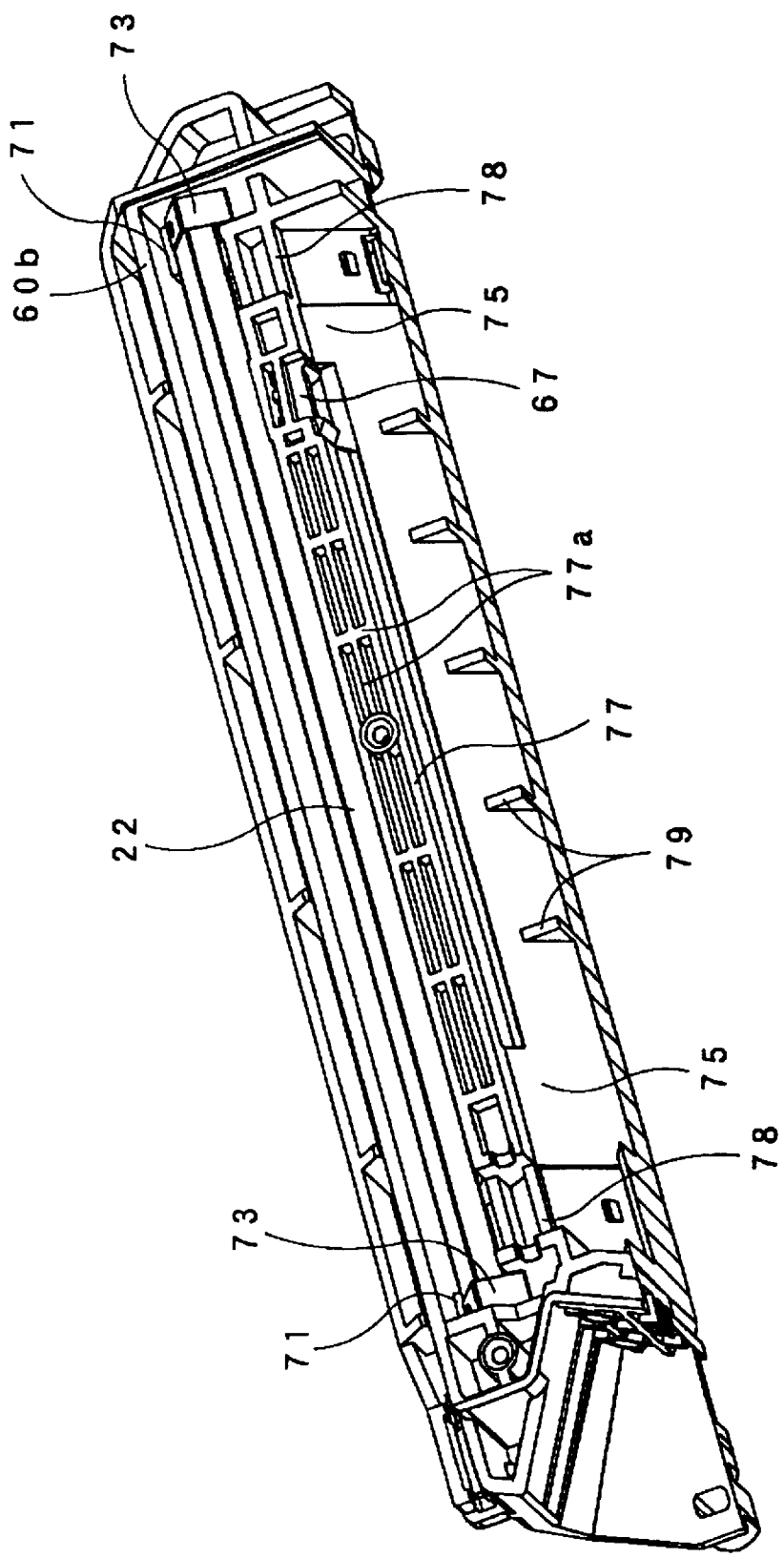
FIG. 4 is a partially enlarged perspective view of the scanning unit showing a reflection mirror and a periphery thereof.
Figure 5:
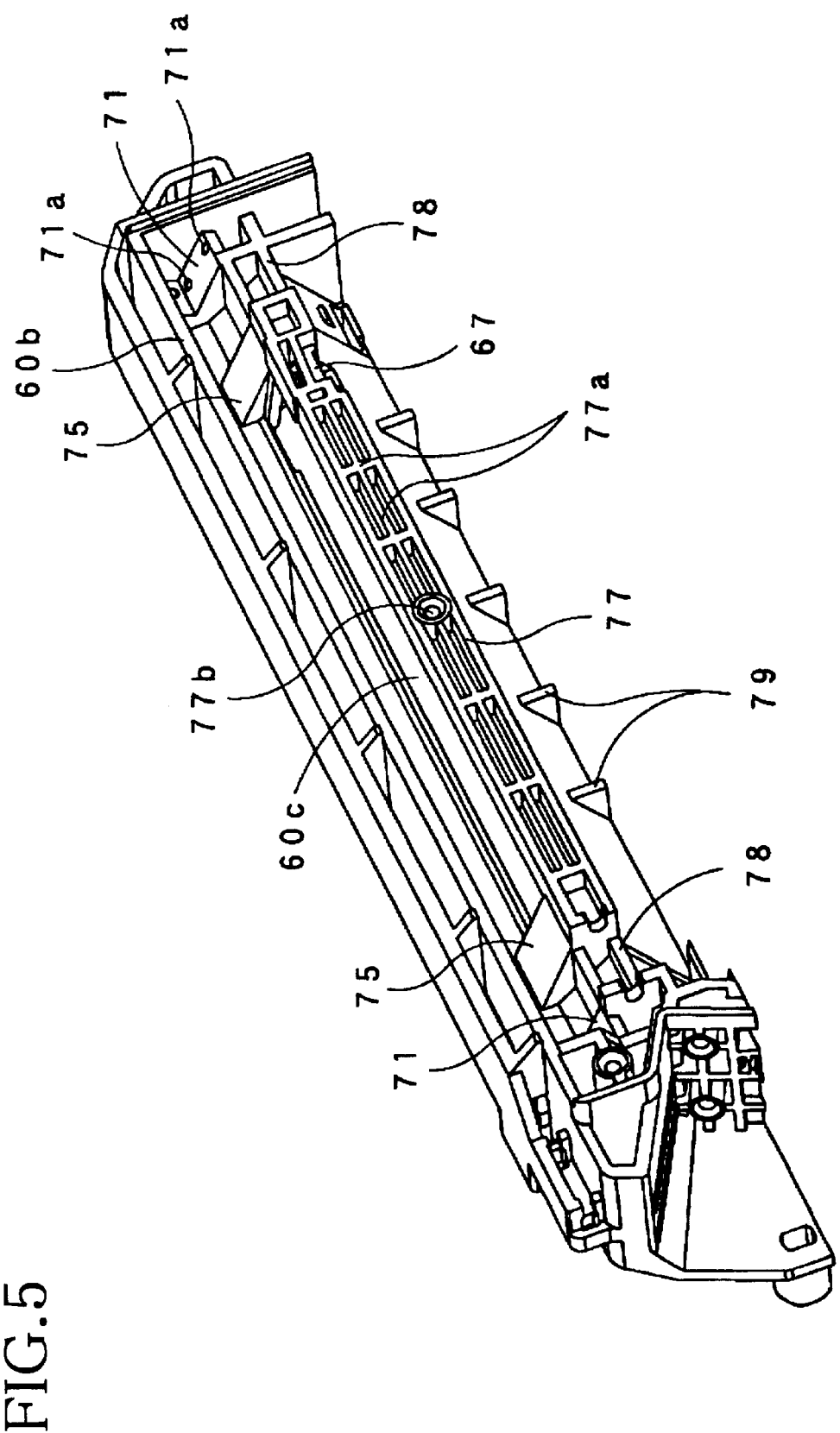
FIG. 5 is a partially enlarged perspective view of the scanning unit viewed from a side of the reflection mirror, wherein the reflection mirror is omitted.

On a rear side of the frame 60 (opposite side to the polygon mirror 20), a supporting portion 71 is provided at each of the right and left corners of the side wall 60b, as shown in FIG. 5. The supporting portions 71 supports the reflective surface and a lower surface of the reflection mirror 22 at each end thereof. As shown in FIG. 4, the reflection mirror 22 supported by the supporting portions 71 is pressed from above by a plate spring 73, so that the reflection mirror 22 can be firmly secured. As shown in FIG. 5, one of the supporting portions 71 has two hemispherical protrusions 71a formed on a supporting surface thereof, and the other supporting portion 71 has one hemispherical protrusion (not shown) formed on a supporting surface thereof. The reflection mirror 22 is supported at the three protrusions 71a and the angle of the reflection mirror 22 is stabilized.

A leg portion 75 is provided at each end side of the opening 60c. A beam portion 77 is disposed above the opening 60c between the leg portions 75. The beam portion 77 is of box shape in cross section with an upwardly open construction. Inside the opening of the beam portion 77, reinforcing ribs 77a are formed vertical to the bottom surface of the opening of the beam portion 77. The laser beam L passing through the fθ lens 21a travels below the beam portion 77 and reflected off the reflection mirror 22, as shown in FIG. 3. The reflected laser beam L is emitted through the cylindrical lens 21b and the cover glass 65. The position and angle of the supporting portions 71 are determined to prevent the reflection mirror 22 from contacting the beam portion 77. The first BD mirror 67 is fixedly disposed on a surface of one of the leg portions 75.

As shown in FIGS. 4 and 5, a reinforcing portion 78 having generally a box-shape in cross section is integrally formed with the side wall 60b of the frame 60, the supporting portion 71 and the leg portion 75, on the bottom plate 60a. As shown in FIG. 2, formed on the bottom plate 60a between the fθ lens 21a and the beam portion 77 are ribs 79 that reinforce the bottom plate 60a. Screw holes 60d, 77b for fixing the frame cover 59 that covers the frame 60 from a side opposite to the bottom plate 60a, are formed at positions along each side of the side wall 60b and at a substantially central portion of the beam portion 77.

In the scanning unit 17, the leg portions 75 and the reinforcing portions 78 are provided at each end side of the opening 60c. Further, the beam portion 77 is provided above the opening 60c between each end side of the opening 60c where the leg portion 75 and the reinforcing portion 78 are provided. An opening of a substantially rectangular shape is defined by the leg portion 75, the reinforcing portion 78, the beam portion 77, and the frame 60.

The reinforcing portions 78 are integrally formed with the side wall 60b and the leg portions 75 so as to connect therebetween. The beam portion 77 is reinforced by the ribs 77a, 79, as well as by screwing the frame cover 59 into the screw hole 77b. Accordingly, the scanning unit 17 can provide greater rigidity in the frame 60 around the opening 60c. In the scanning unit 17, the rigidity of the supporting portions 71 is increased by providing the supporting portions 71 at the corners of the frame 60 between the side wall 60b and the reinforcing portions 78. Accordingly, the reflecting mirror 22 supported by such supporting portions 71 is prevented from being vibrated.

Since the reinforcing portion 78 is provided between the opening 60c and the supporting portion 71 for supporting the reflection mirror 22, rigidity is increased in the area extending from the opening 60c to the supporting portion 71. Further, the supporting portions 71 are disposed away from the opening 60c in the scanning direction. Therefore, the rigidity near the supporting portions 71 can be ensured, and vibrations of the supporting portions 71 and the reflection mirror 22 can be prevented. The reflection mirror 22 is directly supported by the supporting portions 71 disposed away from the opening 60c. Therefore, as compared with a case such that the reflection mirror 22 is supported though some other member, the reflection mirror 22 can be securely supported. Accordingly, the vibrations of the reflection mirror 22 can be prevented and the beam exposing accuracy is stabilized.

Each reinforcing portion 78 reinforces the frame 60 between the opening 60c and one of the supporting portions 71, so that vibrations of the supporting portions 71 can be prevented and consequently the beam exposing accuracy can be favorably improved.

The beam portion 77 is provided between the reinforcing portions 78 that are integrally formed with the frame 60. Thus, a substantially rectangular opening is defined by the beam portion 77, the reinforcing portions 78, and the frame 60. With this structure, the rigidity around the opening 60c is increased and vibrations of the supporting portions 77 can be prevented.

Further, the reflection mirror 22 does not contact the beam portion 77. Therefore, even if the beam portion 77 is vibrated, the vibration of the beam portion 77 is not conveyed to the reflection mirror 22. Accordingly, the beam exposing accuracy of the scanning unit 17 is ensured, and the laser printer 1 can accurately form an image.

Due to the ribs reinforcing the beam portion 77, the rigidity around the opening 60c is increased and vibrations of the supporting portions 71 can be prevented. Therefore, vibrations of the reflection mirror 22 can be prevented and the beam exposing accuracy can be favorably improved.

By fixedly screwing the cover 59 into the screw hole 77b of a fixing portion from a side opposite to the opening 60c, the beam portion 77 is secured to the cover 59. Thus, the rigidity of the beam portion 77 is increased and the supporting portions 77 and the reflection mirror 22 are prevented from being vibrated.

In the above-described embodiment, a leg portion 75 is provided on the bottom plate 60a between the side wall 60b of the frame 60 and an end of the opening 60c formed on the frame 60. The beam portion 77 is provided between the leg portions 75. Thus, an opening of a substantially rectangular shape is defined by the beam portion 77, the leg portions 75, and the frame 60. With this structure, the rigidity around the opening 60c is increased. Therefore, the vibrations of the reflection mirror 22 can be prevented.

The frame 60 is formed into a substantially box shape by the bottom plate 60a and the side wall 60b. The rigidity on the periphery of the side wall 60b is favorably maintained by the box shape structure. Further, the rigidity of the leg portions 75 is favorably maintained by the above-described substantially rectangular shape structure. Each of the supporting portions 71 for supporting the reflection mirror 21 in the frame 60 are provided between the side wall 60b and one of the leg portions 75. Therefore, vibrations of the supporting portions 71, as well as those of the reflection mirror 22 can be prevented, leading to the stable beam exposing accuracy.

The laser printer 1, including the scanning unit 17, can form an image with great accuracy since the scanning unit 17 has high beam exposing accuracy while preventing vibrations of the reflection mirror 22.

While the invention has been described with reference to the embodiment, it is to be understood that the invention is not restricted to the particular forms shown in the foregoing embodiment. Various modifications and alterations can be made thereto without departing from the scope of the invention, as set forth in the appended claims.

For example, the screw hole 77b for fixing the frame cover 59 with a screw is provided at a substantially center of the beam portion 77 in the above-described embodiment. However, a screw hole may be provided on an upper surface of the leg portion 75 or the reinforcing portion 78. In this case, rigidity of the beam portion 77 and peripheral areas of the opening 60c can be ensured. The shape of the beam portion 77, the leg portion 75, and the reinforcing portion 78 is not limited to that described in the embodiment, but another shape may be employed.

While the invention has been described in detail and with reference to the specific embodiments thereof, it would be apparent to those skilled in the art that various changes, arrangements and modifications may be applied therein without departing from the spirit and scope of the invention.

What is claimed is:

1. A scanning device, comprising:

a light source that emits light;

a deflecting device that deflects the light emitted from the light source in a predetermined scanning direction;

a reflection mirror that reflects the light deflected by the deflecting device;

a frame that accommodates the reflection mirror and has an opening through which the light reflected by the reflection mirror passes, a length of the reflection mirror in the predetermined scanning direction being longer than a length of the opening in the predetermined scanning direction;

a supporting member that supports the reflection mirror at the frame, the supporting member being provided away from the opening in the predetermined scanning direction; and a reinforcing member provided between the opening and the supporting member.

2. The scanning device according to claim 1, wherein the reinforcing member reinforces the frame between the opening and the supporting member.

3. The scanning device according to claim 1, wherein the supporting member is provided at both ends of the opening in the predetermined scanning direction, and the reinforcing member is provided between the opening and each supporting member.

4. The scanning device according to claim 3, further comprising a beam portion provided between each reinforcing member.

5. The scanning device according to claim 4, wherein the reflection mirror is supported by the supporting members so as to prevent the reflection mirror from contacting the beam portion.

6. The scanning device according to claim 4, wherein the beam portion includes a reinforcing rib that reinforces the beam portion.

7. The scanning device according to claim 4, further comprising:

a cover provided at a side opposite from the opening of the frame; and a fixing portion provided on at least one of the beam portion and the reinforcing member, the fixing portion fixedly attaching the cover thereto.

8. A scanning device, comprising:

a light source that emits light;

a deflecting device that deflects the light emitted from the light source in a predetermined scanning direction;

a reflection mirror that reflects the light deflected by the deflecting device;

a frame that is formed with a bottom surface and a side surface in a substantially box shape and accommodates the reflection mirror, the frame having an opening that passes the light reflected off the reflection mirror therethrough;

leg portions, each being provided at the bottom surface between the side surface and an end of the opening; and a beam portion provided between the leg portions so as to prevent the beam portion from contacting the reflection mirror.

9. The scanning device according to claim 8, further comprising:

a supporting member that supports the reflection mirror in the frame, the supporting member being provided between each of the leg portions and the side surface.

10. The scanning device according to claim 8, wherein the beam portion includes a reinforcing rib that reinforces the beam portion.

11. The scanning device according to claim 8, further comprising:

a cover provided at a side opposite from the opening of the frame; and a fixing portion provided on at least one of the beam portion and the reinforcing member, the fixing portion fixedly attaching the cover thereto.

12. An image forming apparatus, comprising:

the scanning device according to claim 1;

a photosensitive member exposed to the light emitted from the scanning device;

a developing member that supplies a developing agent to the photosensitive member exposed to the light; and a transferring device that transfers to a recording medium the developing agent supplied to the photosensitive member by the developing member, to form an image on the recording medium.

13. An image forming apparatus, comprising:

the scanning device according to claim 8;

a photosensitive member exposed to the light emitted from the scanning device;

a developing member that supplies a developing agent to the photosensitive member exposed to the light; and a transferring device that transfers to a recording medium the developing agent supplied to the photosensitive member by the developing member, to form an image on the recording medium.

14. The scanning device according to claim 4, further comprising:

leg portions provided on a bottom of the frame between a side wall of the frame and an end of the opening, wherein the beam portion is provided between the leg portions.

15. The scanning device according to claim 9, further comprising:

a reinforcing member provided between the opening and the supporting member.

16. The scanning device according to claim 15, wherein the reinforcing member reinforces the frame between the opening and the supporting member.

17. The scanning device according to claim 15, wherein the reflection mirror is supported by the supporting members so as to prevent the reflection mirror from contacting the beam portion.

* * * * *